(12) United States Patent
Gallagher

(10) Patent No.: US 11,390,466 B1
(45) Date of Patent: Jul. 19, 2022

(54) APPARATUS FOR USE IN MOLECULAR TRANSFER AND DELIVERY OF SUBSTANCES SUCH AS VAPORS, GASES, LIQUIDS, AND SPRAYS

(71) Applicant: James P. Gallagher, Bethlehem, PA (US)

(72) Inventor: James P. Gallagher, Bethlehem, PA (US)

(*) Notice: Subject to any disclaimer, the term of this patent is extended or adjusted under 35 U.S.C. 154(b) by 581 days.

(21) Appl. No.: 16/251,065

(22) Filed: Jan. 17, 2019

Related U.S. Application Data

(60) Provisional application No. 62/618,316, filed on Jan. 17, 2018.

(51) Int. Cl.
*B65G 45/02* (2006.01)
*F16N 7/38* (2006.01)
*F16N 13/22* (2006.01)

(52) U.S. Cl.
CPC .............. *B65G 45/02* (2013.01); *F16N 7/38* (2013.01); *F16N 13/22* (2013.01); *B65G 2201/0247* (2013.01); *F16N 2210/24* (2013.01)

(58) Field of Classification Search
CPC ... B65G 45/02; B65G 2201/0247; F16N 7/38; F16N 13/22
See application file for complete search history.

(56) References Cited

U.S. PATENT DOCUMENTS

| | | |
|---|---|---|
| 1,669,603 A | 5/1928 | Derrick |
| 2,380,827 A | 7/1945 | Downs |
| 2,438,471 A | 3/1948 | Ball |
| 2,696,277 A | 12/1954 | Schweisthal et al. |
| 2,866,538 A | 12/1958 | Goldberg |
| 3,050,262 A | 8/1962 | Curtis |
| 3,109,296 A | 11/1963 | Williamson et al. |
| 3,148,747 A | 9/1964 | Batchelor |
| 3,219,276 A | 11/1965 | Norris |

(Continued)

FOREIGN PATENT DOCUMENTS

| | | | | |
|---|---|---|---|---|
| EP | 1637482 A1 | * | 3/2006 | ............. B65G 45/02 |
| WO | WO-2017203344 A1 | * | 11/2017 | ........ C10M 173/025 |

OTHER PUBLICATIONS

Yan Zhou, Donovan N. Leonard, Wei Guo & Jun Qu; Understanding Tribofilm Formation Mechanisms in Ionic Liquid Lubrication; Scientific Reports; Aug. 16, 2017; pp. 1-8, Published online www.nature.com/scientificreports Article No. 8426.

*Primary Examiner* — William R Harp
(74) *Attorney, Agent, or Firm* — Wilkinson Law Office; Clinton H. Wilkinson

(57) ABSTRACT

A module or fitting for applying and controlling the application of a liquid, gas, vapor, or spray, in an embodiment for applying a lubricant to the neck guides of an air conveyance line configured to slidingly move containers supported on the neck guides, the modules comprising a housing section having a lubricant reservoir formed therein, and a container support section, and defining a slot for securing the fittings to a neck guide support rail in a position interspersed along the air conveyor rails with the neck guides, with the container support surface in alignment with the neck guide support surface, and channels formed in the modules for dispensing the on the container support surface in close proximity to the container support flanges which are slidingly supported.

16 Claims, 5 Drawing Sheets

(56) References Cited

U.S. PATENT DOCUMENTS

| | | |
|---|---|---|
| 3,323,560 A | 6/1967 | Ehlers |
| 3,490,356 A | 1/1970 | Peterson et al. |
| 3,623,463 A | 11/1971 | De Vries |
| 3,643,688 A | 2/1972 | Meinert |
| 3,703,415 A | 11/1972 | Dutton et al. |
| 4,020,812 A | 5/1977 | Hayward |
| 4,040,342 A | 8/1977 | Austin et al. |
| 4,064,970 A | 12/1977 | Reeves |
| 4,475,448 A | 10/1984 | Shoaf et al. |
| 4,506,763 A | 3/1985 | Frost et al. |
| 4,773,846 A | 9/1988 | Munk |
| 5,021,250 A | 6/1991 | Ferguson |
| 5,246,097 A * | 9/1993 | McCoy ................ B65G 47/681 198/448 |
| 5,316,134 A | 5/1994 | Donohue |
| 5,353,908 A | 10/1994 | Wihlidal |
| 5,380,096 A | 1/1995 | Tanaka |
| 5,553,698 A | 9/1996 | Patois et al. |
| 5,578,529 A | 11/1996 | Mullins |
| 5,615,955 A | 4/1997 | Namimatsu et al. |
| 5,772,333 A | 6/1998 | Yabe et al. |
| 5,896,899 A | 4/1999 | Schmitz |
| 6,302,263 B1 | 10/2001 | Bennett et al. |
| 6,368,027 B1 | 4/2002 | Trenel et al. |
| 6,419,078 B1 | 7/2002 | Leathers |
| 6,436,285 B1 | 8/2002 | Kerfcot |
| 6,576,298 B2 | 6/2003 | Bennett et al. |
| 6,808,741 B1 | 10/2004 | McLeod |
| 8,613,354 B2 | 12/2013 | Seger et al. |
| 8,801,341 B2 * | 8/2014 | Turek ................... B65G 51/035 406/197 |
| 2004/0170479 A1 * | 9/2004 | Huxley ................ B65G 51/035 406/86 |
| 2011/0022237 A1 | 1/2011 | Bennett |

\* cited by examiner

APPARATUS FOR USE IN MOLECULAR TRANSFER AND DELIVERY OF SUBSTANCES SUCH AS VAPORS, GASES, LIQUIDS, AND SPRAYS

FIELD OF THE INVENTION

The present invention relates to systems and devices for recurrently applying or delivering molecules of a substance to a surface or environment for the purpose of immersing or otherwise treating the surface or environment with the delivered substance, and more particularly relates in certain embodiments to devices for delivery of lubricating substances to a surface or environment in a vapor, gas, liquid, or spray form.

BACKGROUND OF THE INVENTION

Various devices and fittings are known which are utilized as part of an overall delivery system and have as a primary purpose to recurrently apply or deliver materials and substances in liquid, gas, vapor, or spray form to a site or environment in order to coat or otherwise treat the site surface or environment with the delivered material or substances. There remains, however, a need for a device or fitting which can be utilized in different environments to help transfer and separate molecules in various forms in order to more directly and efficiently apply liquids and vapors to a surface or environment. Within these environments, there are more particular needs for fluid delivery, which can encompass multiple reservoirs for delivering separate types of substances to a single area. Existing delivery systems often provide a poor delivery, causing failure and resulting in poor performance and/or delivery of efficiencies as well as overfeeding of lubricant.

In an embodiment, the present apparatus can be used to dispense liquids, and more particularly lubricants, strategically to a set of guide rails of an air conveyance system to enhance lubrication and object transfer. The air conveyor system directs a pressurized air originating from a blower or other pneumatic force against the containers to propel the containers along a path of the conveyor in a designated direction. A problem encountered with such air conveyor systems is unwanted friction buildup between the slide support surface of the neck guides and the annular support ring or flange on the upper area of the neck portion of the bottles as the bottles are conveyed at high speeds. Friction of course can slow down movement of the bottles, more quickly wear or damage the guides, and also can lead to bottle jams, particularly in inclined and curved sections of the conveyor, further slowing production while the system is shut down to clear the jam. The amount of pneumatic energy required to move the bottles is also raised, adding to the total cost of production.

Attempts have been made to minimize such friction, such as by forming the slide support surface of the neck guides with materials having low friction characteristics. In addition, a food grade lubricant may be applied to the neck guides, either manually during periods when the line is shut down for maintenance and cleaning, or in one arrangement a lubricant is injected into the neck guide area at staggered lubrication points along the length of the neck guides. However, there remains a need for improved systems for directing and applying a lubricant on to the neck guides as part of the lubrication process in appropriate quantities and at designated locations along the conveyor path.

BRIEF SUMMARY OF THE INVENTION

The present invention is directed generally to a lubrication module for use in transferring and delivery of molecules into a variety of different environments and to more efficiently apply liquids and vapors to a surface or environment. In an embodiment, the lubrication module is a fitting apparatus which has been adapted for use with air or pneumatic conveyor systems, and more particularly, air conveyors configured for rapid transport of empty resin or PET (polyethylene terephthalate) bottles or similar containers as part of the bottle manufacturing and/or filling process. Such bottles or containers typically have an annular support flange or ring integrally formed extending radially outwardly around the neck section of the container, generally near the mouth of the container just below a threaded section for receiving a closure. In an air conveyor, the containers are positioned with the lower surface of the support ring resting on a pair of opposing and spaced apart neck guides, which guides define a track or pathway along which the containers are slidably moved in single file, for example, upon exiting a blow moulder, or being moved to a filling apparatus. Additional guides may be provided to stabilize portions of the container below the neck guide against swinging or the like.

The present inventor provides in an embodiment of the invention a fitting apparatus which in use is positioned between lengths of the neck guides of an air conveyance line at designated locations along the conveyor pathway. The fitting apparatus includes a container support guide section having a similar wall profile to the existing neck guides. When the fitting apparatus is secured to the guide rail, the support surface of the fitting apparatus is horizontally aligned with the support surface of the neck guides, ensuring that a smooth and continuous support surface is provided. In addition, the fitting apparatus includes an internal lubricant reservoir having an inlet opening which is connected by a line to a lubricant source. A plurality of exit channels or ports connect between the reservoir and slide support surface in a position to apply a desired quantity of lubricant directly on to the slide support surface of the fittings at or near the location over which the support rings for the containers are passed.

An important feature of the present invention is the seamlessness of the lubrication module or fitting in conjunction with existing neck guides. This seamless integration is further enhanced by the adaptability of the positions of the fitting on the guide rails without requiring any modification to the rail structure as well as the location of the lubricant channel exit points on the fittings, and the possibility of the fittings including multiple reservoirs, thereby making the unit fully customizable to many, if not all current neck guide applications. Another key attribute is the fittings allow for ease of replacement and possibility of flow adjustment in challenging areas, for example long runs, around curves, inclines and declines.

Furthermore, as a complete singular unit the fitting modules or units can be adapted to maximize efficiency, reduce energy, and eliminate costly down time and increase revenue in the facility. Use of the fittings will also minimize material use and lower lubricant usage, creating a more environmentally friendly application as well as improving worker safety throughout the facility.

The varied design implications of the module create a system that is fully customizable and thereby helps system and plant engineering build a more specific and detailed application rather than a patchwork assembly of bolted-on applications to an existing system. The unit allows the operation to design and build a system with optimum functionality to their needs. With these factors, the module will ultimately reduce labor and downtime and create a safer more efficient processing environment.

Further areas of applicability of the present invention will become apparent from the detailed description provided hereinafter.

BRIEF DESCRIPTION OF THE DRAWINGS

The present invention will become more fully understood from the detailed description and the accompanying drawings, wherein.

DETAILED DESCRIPTION OF THE INVENTION

Figure 1:
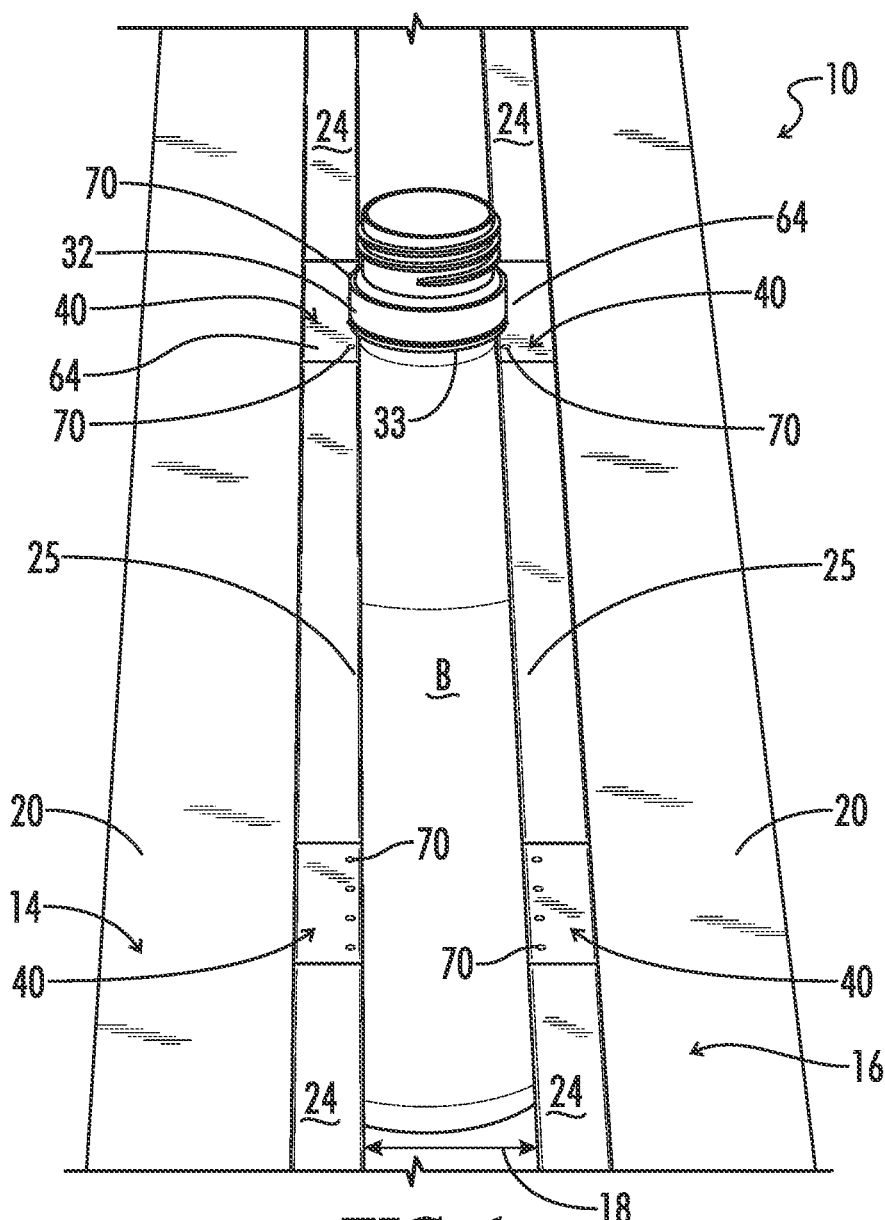
FIG. 1 is a top perspective view of a representative section of the guide rails of a container air conveyance line and illustrating the lubrication modules of the invention.

The following detailed description is of the best mode or modes of the invention presently contemplated. Such description is not intended to be understood in a limiting sense, but to be a non-limiting example of the invention presented solely for illustration thereof, and by reference to which in connection with the following description and the accompanying drawings one skilled in the art may be advised of the advantages and construction of the invention. Wherever possible, like reference numbers have been utilized to refer to like elements or features of the invention throughout the different embodiments illustrated herein.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled," as used herein, is defined as connected, although not necessarily directly, and not necessarily mechanically. Relational terms such as first and second, top and bottom, and the like may be used solely to distinguish one entity or action from another entity or action without necessarily requiring or implying any actual such relationship or order between such entities or actions. The terms "comprises," "comprising," or any other variation thereof are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element. The term "about" or "approximately" applies to all numeric values, whether or not explicitly indicated. These terms generally refer to a range of numbers that one skilled in the art would consider equivalent to the recited values (i.e., having the same function or result). In many instances these terms may include numbers that are rounded to the nearest significant figure.

FIGS. 1-15 illustrate embodiments of the lubrication module fitting apparatus of the present invention and its manner of use in connection with a bottle or container air conveyance line. Reference is made initially to FIGS. 1-5 which show a representative section of the guide rails of such an air conveyance line 10 incorporating the lubrication modules or fittings 40. Although the details are not shown, it will be understood that the air conveyance line 10 is of a conventional type which is configured for empty plastic container handling, and more particularly for rapidly conveying large numbers of containers such as bottles B in a desired direction along the line in a single file between or to a work or process station by directing pressurized air or other gas at the bottles. Line 10 generally includes a support assembly which supports a pair of elongated rails or flanges 14 and 16, which flanges 14 and 16 are horizontally aligned and spaced apart from one another to form an elongated slot or channel 18 between the flanges 14 and 16.

Flanges 14 and 16 each have upwardly and downwardly facing walls 20 and 22, and an inwardly facing side edge 23 connecting between walls 20 and 22. Each flange 14 and 16 supports or is fitted with a neck guide 24, shown in FIG. 1. The exact dimensions and profile of the neck guides 24 will differ depending upon the requirements of the particular bottle and the size of the rail used in the conveying system. One typical neck guide 24 however such as those shown includes a laterally extending notch which enables the guide 24 to be fitted snugly over the inner edge 23 and adjacent portions of upwardly and downwardly facing walls 20 and 22 of the guide rails 14 and 16, where the neck guides are held by, but not limited to, a friction fit. A portion of the top wall of neck guides 24 forms a support surface 25 on which the neck ring or support flange of various types of plastic bottles or other articles is supported and slidingly conveyed at high speeds, also forming an inner edge which defines the width of slot or channel 18 between the neck guides 24. The wall of the neck guides 24 below the inner edge tapers or flares outwardly from the bottom in order to accommodate and provide sufficient clearance for the shoulder portion of the bottles B being transported. Opposing neck guides 24 are spaced apart from one another a distance such that the diameter of an annular neck ring 32 of a container or bottle B is greater than the width of slot or channel 18, such that the containers can be supported on the guides by the neck ring. In addition, the neck portion of the container directly below the neck ring will be spaced from but normally in close proximity to the inner edges of the neck guides 24.

Neck guides 24 are preferably made of a material having characteristics intended to minimize friction buildup between the guide 24 and the bottle neck flange 32, at least in the area of the surface 25 on which the bottle support flange 32 is slidably supported. As indicated above, it will be understood that the profile and dimensions of the neck guides may vary depending upon among other factors the size and shape of the neck and body of the bottles B being handled by the air conveyor system 10. Sections of the guides 24 are conventionally secured end-to-end over the entire length of the support rails or flanges 14 and 16 to form a seamless track along which the containers are directed.

Figure 3:
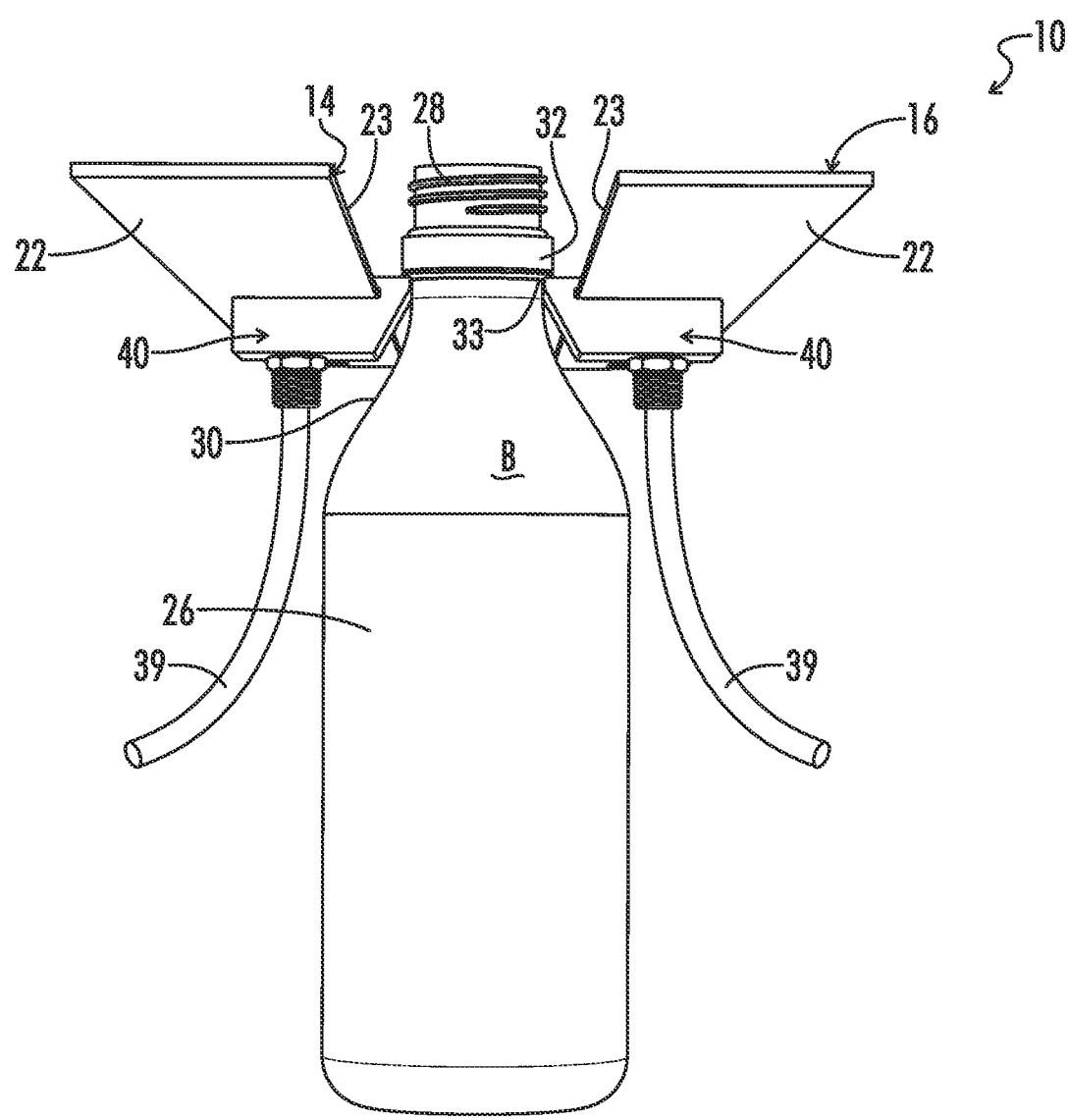
FIG. 3 is a bottom perspective view of the guide rail section as shown in FIG. 2.

The bottles B to be conveyed along the air conveyance line 10 may be of a type formed from a light weight preform, wherein the preform is directed into and heated in a blow mold, and a high-pressure gas is blown into the preform to stretch it to the internal shape of the mold portion of the blow mold. The resulting container B, as illustrated in FIG. 3, will typically include a main body portion 26, a threaded neck portion 28, and a shoulder portion 30 extending between and tapering from the main body portion 26 to the neck portion 28. Bottle B also has an open top or mouth over which a cap or other closure is detachably secured after the bottle has been filled.

The support flange or ring 32 of bottles B is conventionally located on the outer surface of the neck portion 28 below the threads. After being formed by injection molding and during transport from the injection molding process as well as subsequent conveying and handling on a conveyance line (such as movement to a filling station) using air as the motive force for transport, the bottles B or other lightweight containers are positioned with the lower surface 33 of the support flange 32 in sliding contact with the upwardly facing support surface 25 of the neck guides 24. As illustrated in FIG. 1, lubrication modules or fittings 40 in accordance with the present invention are provided at prescribed intervals along the bottle transfer path formed by the rails 14 and 16 and neck guides 24, which fittings 40 are positioned in-line with and interspersed between elongated sections of the neck guides 24. It will be understood that for purposes of illustrating the positioning of the fittings 40, the neck guides 24 are illustrated in a fragmentary view, and further that the neck guides 24 may be provided in any suitable length. Each fitting 40 includes a support wall 64 having a surface for slidably engaging the neck ring of the bottles B to be conveyed. The surface of wall 64 of the fittings 40 is aligned with the support surface 25 of adjacent guides 24. In addition, fittings 40 provide for continual molecular transfer or dispensing of a lubricant material directly on to the support surface 64 of the fittings 40 in close proximity to the container neck rings 32. Continual sliding movement of the lower surface 33 of neck ring 32 of bottles B on surface 64 of the fittings 40 will tend to cause the lubricant to spread over surface 25 of adjacent neck guides 24 positioned downstream from a fitting in the direction of movement of the bottles. In this manner, the lubricant is dispensed along the entire air conveyance line in a controlled manner calculated to minimize frictional forces between the contact surfaces 25 and 64 of the neck guides 24 and lower surface 33 of the support flange or ring 32 of the bottles B.

Figure 2:
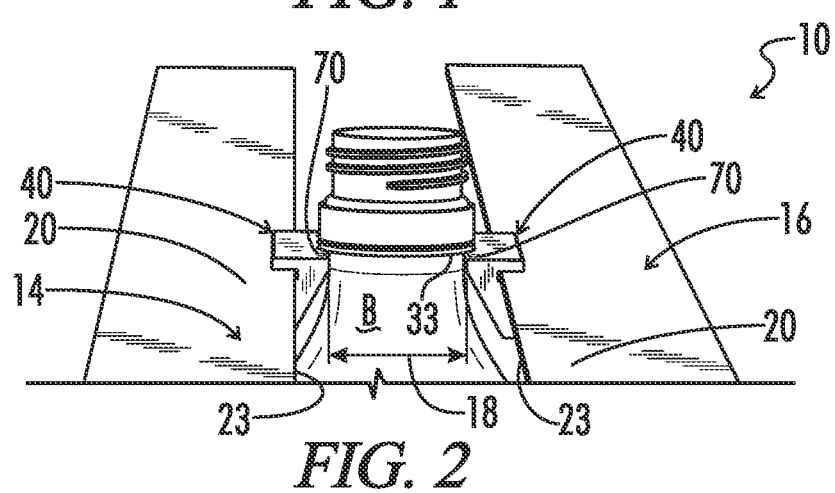
FIG. 2 is another perspective view of a portion of the guide rail section shown in FIG. 1 with the neck guides removed.
Figure 4:
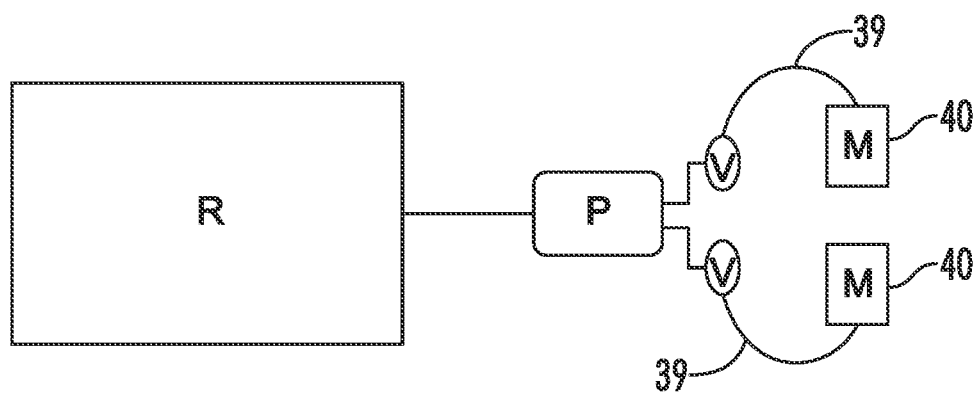
FIG. 4. is a diagrammatic view of a lubrication system for use with a container air conveyance line.

As illustrated diagrammatically in FIG. 4, each lubrication module or fitting M (also 40) will be operably connected by a line 39 to a reservoir R containing a liquid to be dispensed. Reservoir R may be any type of suitable vessel such as a pressure vessel having a control system and pump P including one or more valves V able to control the flow and therefore the quantity of lubricant supplied from the reservoir R to each of the fittings 40, such that metered quantities of liquid lubricant can be continually, variably or repeatedly dispensed to the fittings 40. In the illustrated embodiment, the fittings 40 as indicated above are designed to be secured directly to the neck guide support rails 14 and 16 in a position interspaced between the neck guides 24. The downwardly facing surface 33 of the support rings or flanges 32 on bottles B come into sliding contact with the support surface 25 of neck guides 24 and support surface 64 of the fittings 40. The fittings 40 may be positioned on rails 14 and 16 as shown in FIGS. 1-3 in aligned pairs with each fitting 40 on rail 14 aligned with a corresponding fitting 40 on rail 16. Alternatively, the fittings 40 may be staggered or secured at non-aligned positions on rails 14 and 16. Fittings 40 may also be of different lengths as may be required in accordance with the particular requirements of the conveyance line 10.

Figure 10:
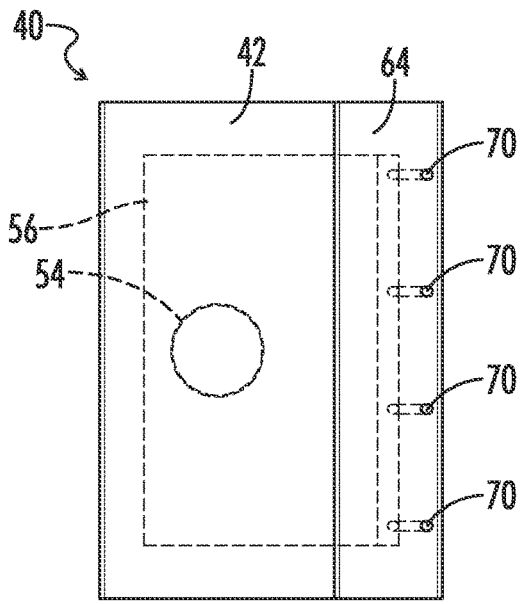
FIG. 10 is a top elevation view of the module.
Figure 11:
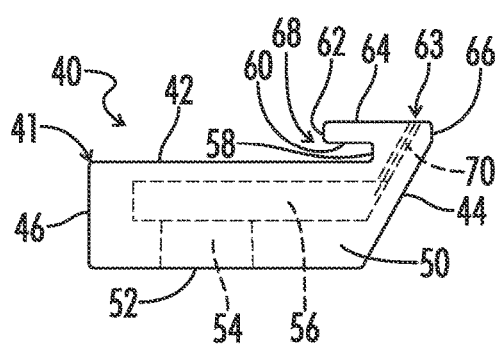
FIG. 11 is a side elevation view of the module.

Referring now to FIGS. 6-11, there is shown an embodiment of lubrication module or fitting 40 in greater detail. Fitting 40 can be made of any suitable material or a combination of materials such as a plastic, metal, or a composite material, in a uniform and consistent manner to establish a singular unit construction. Fitting 40 may be molded, printed, or otherwise formed into a unitary construction. Fitting 40 generally includes a main body or housing portion 41, and a container support section 63 which includes a wall 64 having a support surface on which the annular neck ring 32 of the bottles or containers B is slidingly supported, and a slot 68 in which inner edge 23 of one of flanges 14 and 16 is received to secure the fitting 40 to the rail. In the illustrated embodiment, main housing portion 41 is generally rectangular and is defined by top wall 42, angled front wall 44, rear wall 46, opposing side walls 48 and 50, and bottom wall 52. A bore or aperture 54 is formed in bottom wall 52, which bore 54 is in direct communication with and serves as an inlet into a reservoir or internal cavity 56. As best shown in FIG. 11, front wall 44 tapers or flares outwardly from bottom wall 52, and extends upwardly beyond the height of top wall 42 of housing section 41, terminating at inner edge 66. Inner edge 66 then extends upwardly and terminates at neck ring support wall 64, which extends laterally in the direction of rear wall 46. Short wall 58 joins between the end of top wall 62 and lower lateral wall 60, which is spaced apart from the surface of top wall 42 to form rearwardly facing slot 68. Finally, edge 62 joins between the innermost ends of lower lateral wall 60 and upper wall 64.

The dimensions and angle of inner edge 66 and front wall 44 are relative to the particular application and is fixed per unit but may be varied depending on the clearance needed per application of fitting 40 which will depend primarily upon the characteristics of the bottles B being transported by the air conveyor line 10, and therefore also of the neck guides 24 being used. A sufficient spacing should be maintained between front wall 44 and the outwardly flared neck portion of the bottles B being conveyed in order to reduce jamming or wedging of the bottles in channel 18.

Top wall 42, front wall 44, and walls 58-66 generally form container neck guide support section 63, with inwardly directed slot 68 being formed between walls 42, 58, and 60. As shown in FIGS. 1-5, slot 68 is dimensioned to tightly receive either flange 14 or 16, securing the fitting 40 to the flange. It will be understood, however, that fitting 40 may be secured to flange 14 or 16 by other suitable arrangements, such as using mechanical fasteners, adhesives, or a combination of securing arrangements. See also FIGS. 12-13 discussed below, which illustrate one such other securing arrangement. In FIGS. 1-3 and 5, the fittings 40 are illustrated secured to flange 14 and 16 in aligned pairs, but in other embodiments may be staggered, individually placed, or otherwise positioned as needed to provide an adequate lubricant supply to surface 64 according to the requirements of the particular conveyance line. As illustrated in FIG. 1, neck guides 24 are secured to flanges 14 and 16 with their ends in abutting contact with side surfaces 48 and 50 of the fittings 40. Each fitting 40 will also be dimensioned such that upper wall 64 is substantially in horizontal alignment with the bottle support surface 25 of the neck guides 24, thereby providing a substantially planar and continuous support surface between the neck guides 24 and fittings 40 on which the bottles B are slidingly conveyed.

Cavity or reservoir 56, as best shown in FIGS. 10 and 11, is located in the interior of the housing section 41 of fitting 40 in communication with inlet opening 54 and defined by a wall or walls positioned between the front, rear, top, bottom and side walls 42-52 of the housing section 41. In order to provide a volumetric flow of lubricant, a volume is needed to create pressure. By providing reservoir 56 in the housing section 41 of fitting 40, the volume required to create such required pressure is provided. It will be understood that the dimensions of reservoir 56 may be varied in order to achieve an adequate or desired pressure and resulting volumetric flow according to a particular application. In addition, reservoir 56 may be formed as part of inlet 54.

A plurality of hollow outlet channels 70 are formed in fitting 40 which connect between reservoir 56 and the exterior surface of upper wall 64. In an embodiment, the exit points or locations of the outlet channels 70 on upper wall 64, as illustrated in the FIGS., are spaced apart from each other equidistantly on upper wall 64 from wall 66, while in other embodiments may be differently spaced to suit the requirements of the particular air conveyance line or system. In another embodiment, the channels 70 are tubular and the exit points of channels 70 on wall 64 are spaced from but also in close proximity to wall 66 so as to be positioned along or close to the portion of the surface of wall 64 on which the support rings 32 of bottles B are slidably supported and conveyed. In an embodiment, the channels 70 have a diameter at their exit points of between about 0.2 mm and 20 mm, while in another embodiment channels 70 have a diameter of between about 0.5 mm and 5 mm, and in still another embodiment channels 70 have a diameter of about 1 mm. In still other implementations, the diameter of the channels may be dimensioned or varied according to the requirements of the desired application.

Annular support flange or ring 32 of the bottles B will be supported on upper wall 64 of fitting 40 when slidably moved along the air conveyance line 10 by a pneumatic force. By locating the exit points to the channels 70 in the surface of upper wall 64, a lubricant may be dispensed from reservoir 56 directly on to upper wall 64 on or in close proximity to the location on the surface of wall 64 where the bottle support flanges 32 directly contact wall 64, without interfering with other necessary components of the air conveyance system. The exit ports to channels 70 are preferably spaced from the junction of upper wall 64 and wall 66 to minimize dripping of the dispensed lubricant. Inlet bore 54 in bottom surface 52 of the fitting may be threaded or otherwise made suitable for receiving a tubular line 39 which is connected to a supply of the lubricant to be directed to reservoir 56. The lubricant is directed into and may be stored or contained in the reservoir 56, and when necessary can be agitated or mixed in the reservoir prior to being dispensed through the channels 70. It will be understood that channels 70 may be sized or modified so as to dispense a desired flow of lubricant through the channels to the exit points under a given pressure. The lubricant in an embodiment will be dispensed slowly from the channels 70 such that it in effect bubbles out of the exit ports. The rate of flow of lubricant should not be so high that it sprays out of the exit ports, which may cause drips and form puddles of lubricant on the floor surface, creating a potential safety hazard. As shown in FIG. 4, a control element will also be provided as part of the lubrication system, including one or more control valves to control the quantity of lubricant supplied from the lubricant reservoir for each fitting under a given pressure. As indicated above, fitting apparatus 40 is designed in such a way as to create a ledge or slot 68 below the exit point in order to facilitate attachment of the apparatus to a fixed or moveable structure. It will be understood that the exact dimensions of the fitting apparatus 40 may be modified to fit conveyance line assemblies having different structures, and well as different positions on the same line.

In an embodiment, the fitting 40 has a width of 50.8 mm from end surface 48 to end surface 50, and contains four channels 70 each having a separate exit point spaced apart on upper wall 64. In other embodiments, the fittings 40 may have a greater or lesser number of channels 70 through which the lubricant is dispensed, although the fittings 40 preferably have multiple exit points on upper wall 64, which may either be aligned in a single row or offset into multiple rows. In still another embodiment, the fittings 40 may have a channel 70 connected to reservoir 56, which channel divides into several branches in order to provide multiple exit points on upper wall 64. By providing multiple exit points on upper wall 64 for the lubricant, which exit points are spaced apart and aligned longitudinally in the same direction the bottles B are being pneumatically moved on the conveyor line, as compared to a single nozzle the amount of lubricant dispensed by the lubricating system can be more precisely controlled, and further the lubricant can be dispensed more evenly without over-lubrication. In addition, by providing multiple channels and/or exit points in each fitting 40, if a channel becomes blocked or clogged, the lubrication system can still be operated to dispense sufficient quantities of lubricant so that the line does not have to be shut down for maintenance and repair and/or replacement of the clogged fitting. The lubricant pressure generated by the design of the fitting further reduces the likelihood of any such clogs from occurring.

Provision of multiple exit points on upper wall 64, either by having multiple channels each with an individual exit point, or a lesser number of channels which branches to multiple exit points, allows the lubricant to be dispensed at a more controlled rate while still being dispensed in adequate quantities. To further illustrate the manner of use of the present invention, when a bottle support ring 32 of a container supported on neck guides 24 slidably reaches one of the fittings 40 and passes over or in close proximity to an exit point of a channel 70 on upper wall 64, the lubricant will preferably be dispensed through each channel 70 to its associated exit point at a relatively slow, controlled rate such that the lubricant forms a droplet which protrudes upwardly out of the channel as it is forced out of the exit point. This droplet will be contacted by the bottle support ring as it passes laterally at a high speed over the outlet or exit point. During normal use of the conveyance line, large numbers of bottles B are being continually moved at a high rate of speed along the neck guides 24 in single file, each also slidingly passing over upper wall 64 of the fittings 40 of the present invention. When a first bottle B is slidingly brought into contact with the upper wall 64 of fittings 40, the bottle support ring 32 will initially contact a droplet of lubricant protruding upwardly out of the first exit point on upper wall 64 (for purposes of reference herein, the first exit point refers to the exit point of one of the channels 70 positioned the furthest upstream with respect to the direction the bottles B are being moved, while the other exit points considered to be situated downstream in relation to the first exit point). Shortly thereafter, a second bottle B adjacent the first bottle B will pass over the first exit point. Due to the high rate of speed at which the bottles B are moving along the conveyance line, this may occur before a new droplet of lubricant is formed in the first exit point, since as indicated above the lubricating system will be regulated such that the lubricant seeps out of the channels relatively slowly so as not to overlubricate. The system may also be regulated, however, so that a new droplet of lubricant is formed in one of the exit points located downstream from the first exit point before the second bottle B passes over such downstream exit point. Thus, in operation, provision of multiple exit points ensures that a much greater number of the support rings of bottles B will pass directly through a droplet of lubricant as the bottles are conveyed across upper wall 64 of the fittings 40 at a high rate of speed. This enables the lubricant to be more evenly and effectively spread over the neck guides 24 in a downstream position adjacent the fittings 40. In contrast, in order to dispense lubricant with only a single channel and exit point, the lubricant would necessarily have to be dispensed at a higher flow rate, which is undesirable as this will tend to cause spraying and dripping of the lubricant, creating a safety hazard due to the buildup of lubricant on the surfaces of the machinery, floor, and is less efficient. In addition, the fittings 40 would likely have to be positioned along the conveyance line between much shorter lengths of the neck guides, increasing the number of components and cost of the lubricating system. Significantly less splatter of the lubricant is generated through use of the present invention as compared to conventional lubrication techniques.

Figure 14:
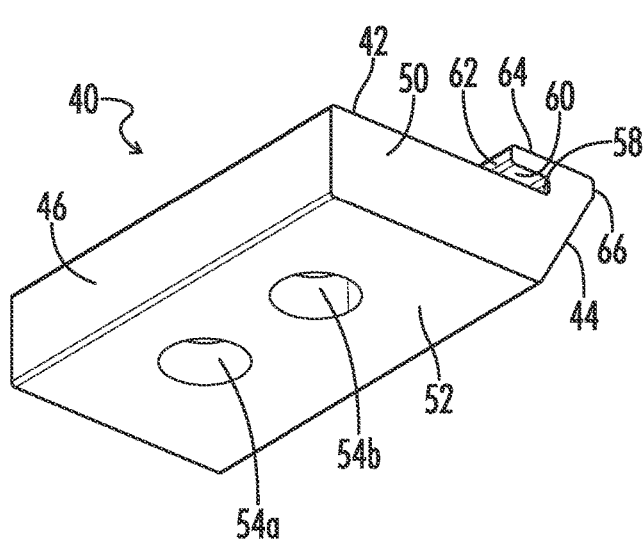
FIG. 14 is a perspective view from the bottom of another embodiment of the lubrication module having multiple reservoir inlets.
Figure 15:
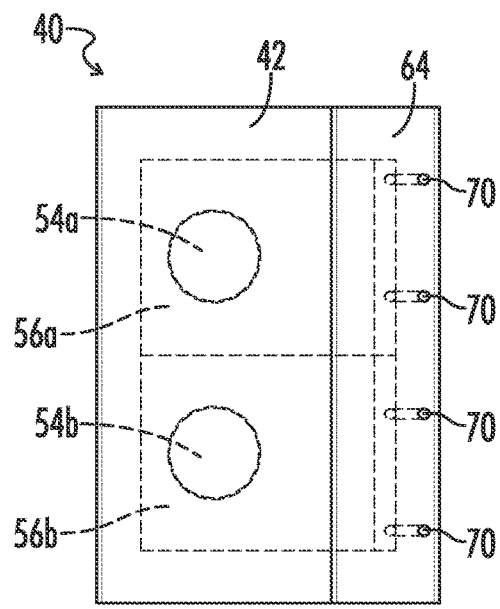
FIG. 15 is a top elevation view of another embodiment of the lubrication module having separate reservoirs.

FIG. 14 illustrates another embodiment of the present invention in which lubrication fitting 40 includes multiple inlets 54a and 54b, which would enable two or more different lubricating substances to be directed into and mixed in the common or shared reservoir 56 prior to be dispensed through channels 70. In this manner the different substances could also be added at different speeds, or at different time intervals, as desired. FIG. 15 illustrates another embodiment in which the fitting 40 includes multiple inlets 54a and 54b which lead to separate reservoirs 56a and 56b in the housing section 41. In this embodiment, substances in the separated reservoirs are not mixed prior to being dispensed though the channels, although in some embodiments the lubricants or substances in the separate reservoirs could be mixed in one or more common channels connecting within the fitting before being directed to an exit point.

Figure 5:
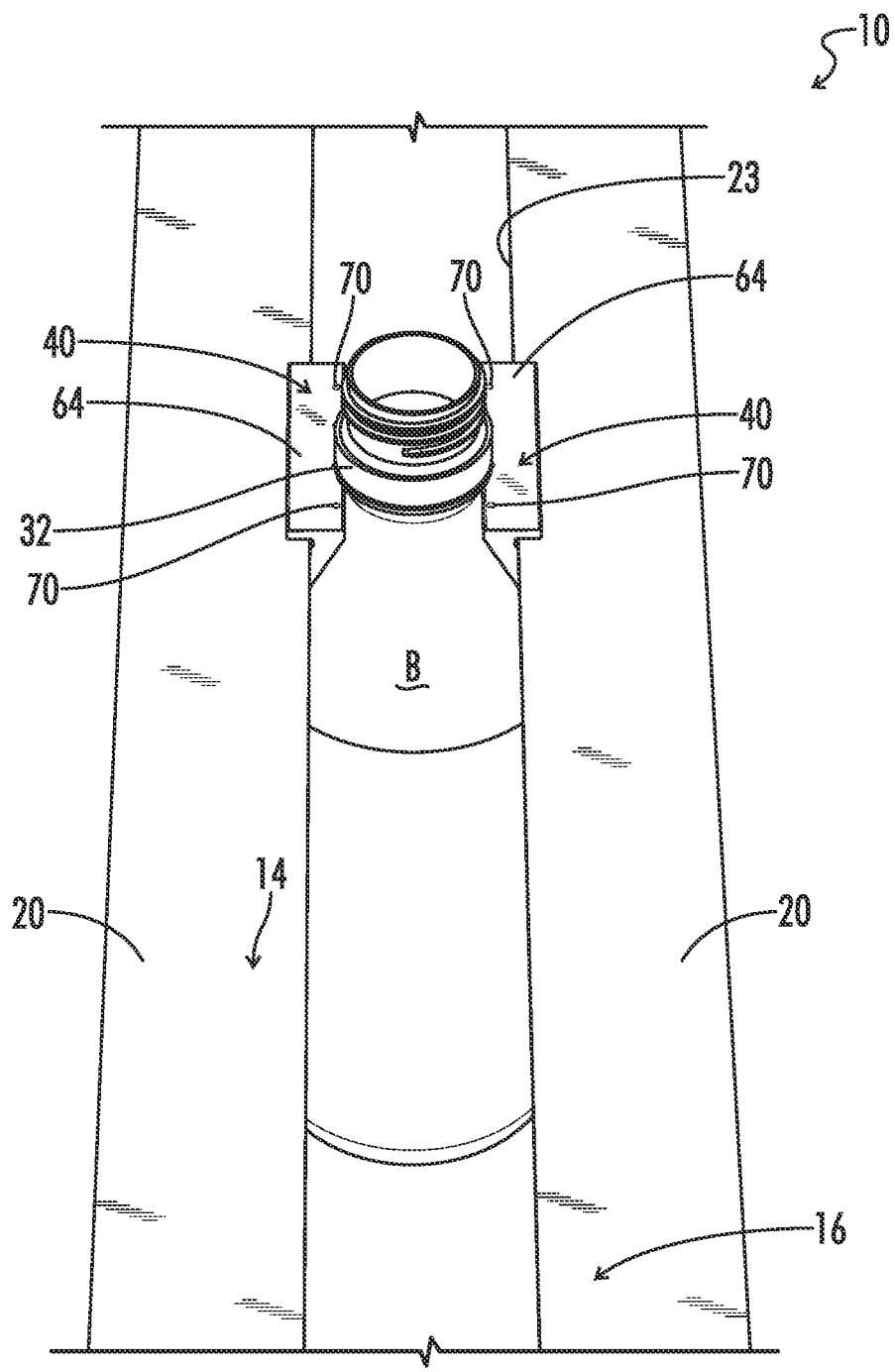
FIG. 5 is atop perspective view of a pair of lubrication modules secured to the guide rails section with the neck guides removed.
Figure 6:
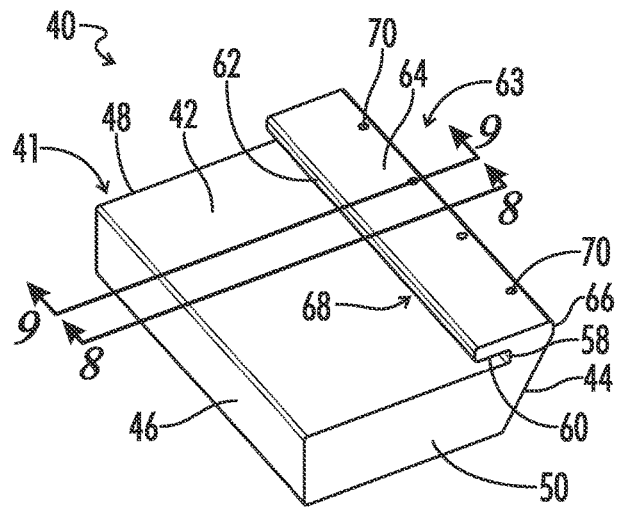
FIG. 6 is a perspective view from the top of an exemplary embodiment of the lubrication module of the invention.
Figure 7:
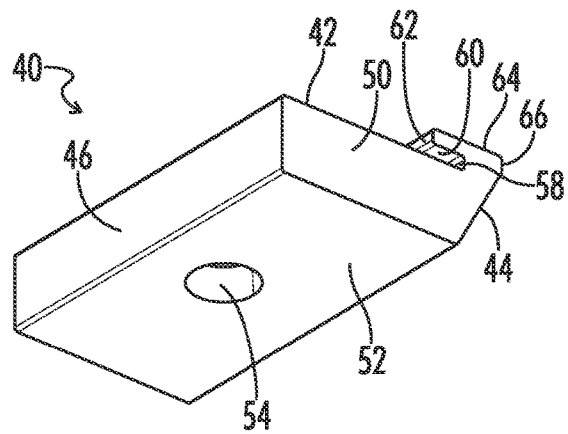
FIG. 7 is a perspective view from the bottom of the lubrication module shown in FIG. 6.
Figure 8:
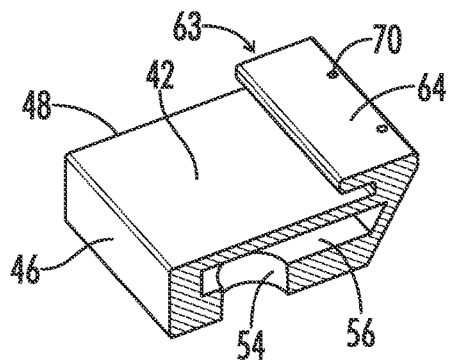
FIG. 8 is a sectional view taken through line 8-8 in FIG. 6.
Figure 9:
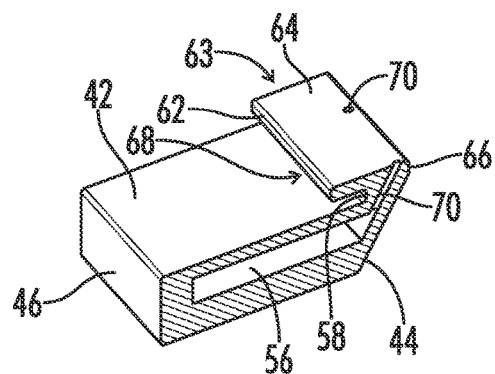
FIG. 9 is a sectional view taken through line 9-9 in FIG. 6.

As illustrated in FIGS. 1 and 5, opposing pairs of fittings 40 are distanced apart such that slot 18 formed between the neck guides 24 and fittings 40 has a sufficient width such that unless the bottles B are swinging, the neck portion 28 of the bottles B below the annular neck support ring 32 will not be in contact with the outwardly flared front surfaces 44 of the fittings 40. Similarly, upper wall 66 of the fittings 40 should be horizontally aligned with the upper surface 25 of the neck guides 24, with the width of slot 18 between the neck guides and fittings being substantially equidistant, so the annular neck support 32 on the bottle Bis supported on the neck guides and fitting but also with some clearance between the guides and fitting and the surface of the bottles B below the neck support ring. As indicated above, the angle of inwardly facing front surfaces 44 may also be varied depending upon the dimensions of the bottles B to be conveyed. It will be understood that some bottles such as conventional two-liter soda bottles have a shorter neck section than some other bottles. If the shoulder portion 30 of the bottles B is angled more steeply outwardly, for example, the angle of front surfaces 44 may be adjusted to accommodate the wider shoulder section 30. It will be understood therefore that wall 44, in conjunction with wall 66 will be fabricated to accommodate bottles or containers having different body designs and as a result having different spacing requirements.

The fittings 40 are advantageous in that a lubricant can be applied directly to the undersurface 33 of the neck support ring 32 of the bottles B. In addition, the fittings 40 can be quickly and easily removed and replaced with a new fitting when they become worn or otherwise require replacing without disturbing the neck guides or other major components of the air conveyor system. In some embodiments, after being formed into a unitary body by a printing process or other manufacturing method, the fittings 40 may be dipped in a sealant or coating material in order to reduce the possibility of leaks forming in the fitting material either in reservoir 56 or the body of the fittings 40. In addition, the upper wall 64 of the fittings may be further treated with a low friction coating to further reduce the amount of heat buildup and friction between upper wall 64 and the bottle support rings 32 as they are passed at high speeds over the neck guides and fittings 40.

Figure 12:
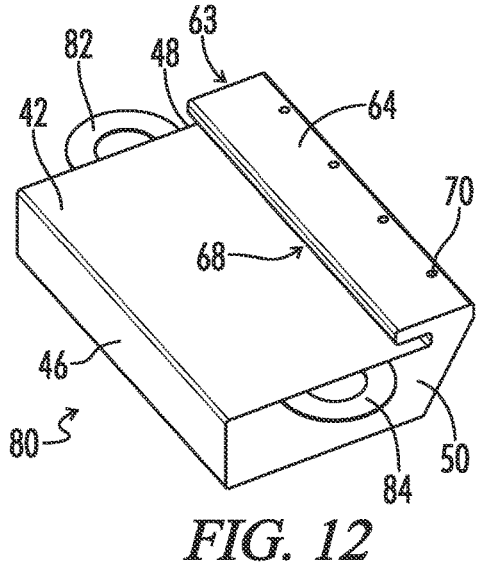
FIG. 12 is a perspective view from the top of another embodiment of the lubrication module.
Figure 13:
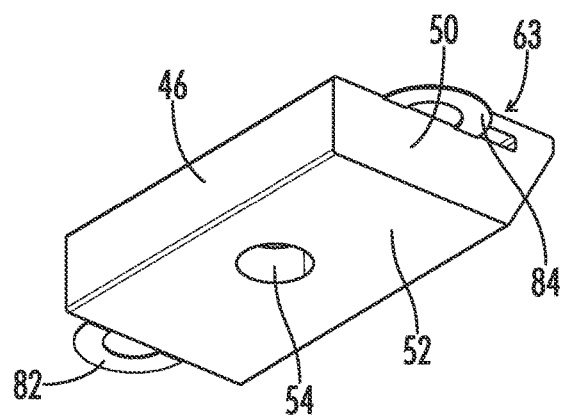
FIG. 13 is an perspective view from the bottom of the lubrication module shown in FIG. 11.

FIGS. 12 and 13 illustrate another embodiment of the present invention in which lubrication module or fitting 80 is similar in structure to fitting 40, with the exception that fitting 80 in addition includes a pair of brackets 82 and 84 which extend outwardly from the side surfaces 48 and 50 of the fitting 80. Brackets 82 and 84 may be formed by any suitable means such as by molding with fitting 40, and provide an additional structure for attaching the fittings 40 to legs 16 and 17 of the air conveyance line support apparatus by passing mechanical fasteners through the brackets.

In the course of manufacturing and molecular application, many types of systems are developed to enhance and facilitate the efficient utilization of energy. In that spirt and within many types of environments, the present inventor has developed a functional part which was developed in order to help facilitate efficiency and function. The fitting apparatus was developed to be a singularity constructed unit devised to help increase efficiency in various types of molecular transfer including but not limited to liquid transfer, vapor, fuel, air, and liquids of various viscosity.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. As used throughout, ranges are used as shorthand for describing each and every value that is within the range. Any value within the range can be selected as the terminus of the range.

I claim:

1. A lubrication module for lubricating the neck guides of a pneumatic container conveyor system comprising:
    a housing section defined by top, bottom, front, rear and side walls, said front wall being outwardly flared;
    a container support section integrally formed with the housing section and having an upper wall including a container support surface, an inner edge connected extending downwardly from the upper wall, and the front wall of the housing section connecting between the inner edge of the container support section and bottom wall of the housing section;
    a lubricant reservoir defined in an interior of the housing section;
    an inlet opening in the housing section configured for connecting the module with a lubricant supply, said inlet opening connecting to the lubricant reservoir; and
    a plurality of channels formed in the interior of the module each connecting between the lubricant reservoir on one end and a spaced-apart exit opening on the container support surface of the module on another end, wherein the lubricant reservoir is dimensioned to hold a volume of lubricant sufficient to provide a uniform volumetric flow of said lubricant from the lubricant supply through each of the plurality of channels to the exit openings on the container support surface;
    said module configured to be secured to a neck guide support rail of the conveyor system interspaced between sections of the neck guides with the container support surface of the module horizontally aligned with a container support surface of each adjacent neck guide section.

2. The lubrication module of claim 1 wherein the container support section additionally comprises a lower wall extending over a portion of the housing section and spaced from the top wall of the housing section, forming a laterally extending slot configured to receive an inner edge of the neck guide support rail for securing the module to the neck guide support rail.

3. The lubrication module of claim 2 wherein the inlet opening connecting to the reservoir is positioned in the bottom wall of the housing section.

4. The lubrication module of claim 2 wherein the container support surface extends along the inner edge of the housing section, and wherein the slot is open away from the front wall.

5. The lubrication module of claim 4 wherein the exit openings to at least some of the channels on the container support surface of the upper wall of the container support section are positioned along said inner edge.

6. The lubrication module of claim 4 wherein when the module is secured to the neck guide support rail the exit openings to the channels on the container support surface are aligned along a conveyor pathway defined by the support rail.

7. The lubrication module of claim 6 wherein the exit openings of the channels have an effective diameter of about 1 mm.

8. The lubrication module of claim 7 additionally comprising at least one bracket member attached to the housing portion, said bracket for securing the module to the neck guide support rail.

9. The lubrication module of claim 8 wherein the module is formed as a unitary structure by printing, molding, or another manufacturing process.

10. The lubrication module of claim 9 additionally comprising multiple reservoirs in the housing section, and a plurality of said channels connecting between each reservoir and the container support surface.

11. The lubrication module of claim 10 wherein each reservoir has a separate inlet opening.

12. The lubrication module of claim 1 wherein a plurality of said modules are securable to the neck guide support rails at prescribed intervals along the pneumatic conveyor system conveyance line in end-to-end and abutting contact with adjacent neck guides.

13. The lubrication module of claim 1 additionally comprising another inlet opening connecting to the lubricant reservoir.

14. A lubrication module for lubricating the neck guides of a pneumatic container conveyor system comprising:
    a container support section having an upwardly facing support surface configured for slidably supporting an annular neck ring of a container on the support surface;
    a main housing section having an interior lubricant reservoir, an inlet opening connecting to the reservoir and configured for feeding a lubricant supply to the lubricant reservoir, and a plurality of channels each connecting from a spaced-apart location between the lubricant reservoir on one end and an exit port on the container support surface on another end, said reservoir dimensioned to hold a volume of lubricant required to direct a uniform volumetric flow of said lubricant from the lubricant supply out of said exit ports; and
    a slot configured for securing the lubrication module to a neck guide support rail of the conveyor system interspaced between elongated sections of the neck guides with the container support surface of the lubrication module horizontally aligned with a container support surface of each adjacent neck guide section.

15. The lubrication module of claim 14 wherein a plurality of said modules are securable to the neck guide support rails at prescribed intervals in end-to-end and abutting contact with adjacent neck guides.

16. The lubrication module of claim 14 wherein the channels have a uniform length.

* * * * *